United States Patent [19]

Burton et al.

[11] Patent Number: 5,012,489
[45] Date of Patent: Apr. 30, 1991

[54] METHOD FOR SENDING A PLURALITY OF DATA CHANNELS OVER A SINGLE COMMUNICATIONS LINE

[75] Inventors: Richard J. Burton, Buford; John A. Copeland, III, Dunwoody; John W. Jerrim; Toby L. Nixon, both of Duluth; Martin H. Sauser, Jr., Atlanta; Robert E. Weatherford, Jr., Norcross, all of Ga.; Larry D. Becker, Walton Beach, Fla.; David F. Strawn, Marietta, Ga.

[73] Assignee: Hayes Microcomputer Products, Inc., Norcross, Ga.

[21] Appl. No.: 267,963

[22] Filed: Nov. 7, 1988

[51] Int. Cl.$^5$ .......................... H04L 5/02; H04L 5/14
[52] U.S. Cl. ............................................ 375/8; 379/98
[58] Field of Search .................................. 375/8, 37, 9; 379/96–98; 178/3, 2 B, 2 R

[56] References Cited

U.S. PATENT DOCUMENTS

| 4,700,358 | 10/1987 | Duncanson et al. | 375/8 |
| 4,751,510 | 6/1988 | de Saint Michel et al. | 375/8 X |
| 4,761,646 | 8/1988 | Choquet et al. | 375/8 X |
| 4,890,316 | 12/1989 | Walsh et al. | 379/98 |
| 4,893,305 | 1/1990 | Fernandez et al. | 375/8 X |

FOREIGN PATENT DOCUMENTS 0265272 4/1988 European Pat. Off. .................. 375/8

OTHER PUBLICATIONS

ANSI Standard X3.4 (1977), pp. 10, 18–23.
CCITT Standard X.25 (1976, 1980, 1984).
Evercom 12e/24e External Modems Owner's Manual and Reference Guide, pp. 72–88 and 95–106; copyright 1987.

Primary Examiner—Douglas W. Olms
Assistant Examiner—Ralph Smith
Attorney, Agent, or Firm—Jones, Askew & Lunsford

[57] ABSTRACT

A method for communicating with a plurality of hosts connected to an X.25 network and for selectably using a character as a control character or a data character. Each character received from the X.25 network is inspected to determine if it is one of a set of reserved characters. If so, the character is encoded before being sent to its final destination. Data intended for the X.25 network is inspected for the presence of a predetermined control character. If the control character is present, the next character is inspected to determine whether it is a command character or an encoded data character. If this next character is an encoded data character, it is decoded and provided to the X.25 network. If this next character is a command character, then the command is executed. The method allows the use of any character as either a command character or data character. Data transfer between the DTE and DCE is assigned a PAD and a virtual channel number which corresponds to a particular host on the X.25 network. The channel number may, but need not, be the same as the X.25 device address for that host. The method therefore allows the DTE and DCE to simultaneously communicate with a plurality of X.25 hosts over a single telephone line or physical transmission link.

24 Claims, 4 Drawing Sheets

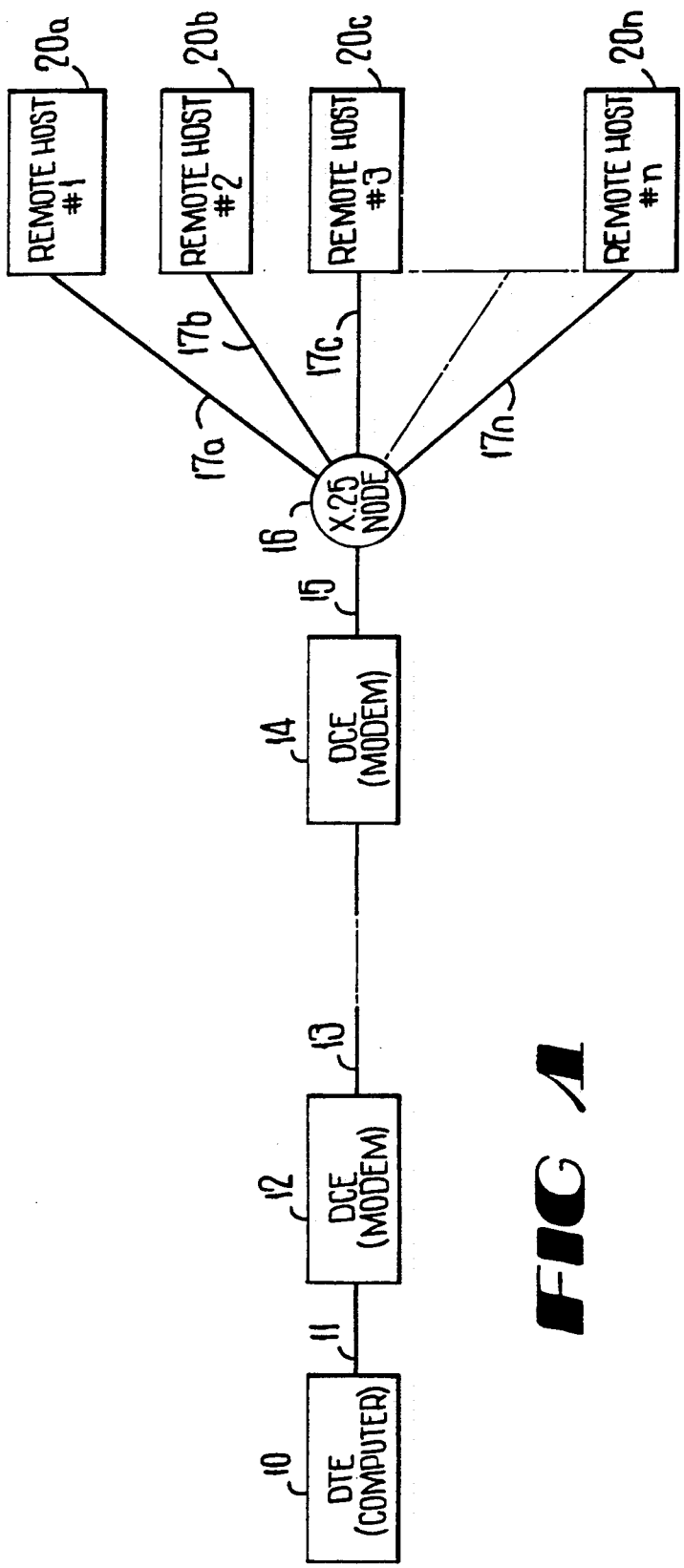

METHOD FOR SENDING A PLURALITY OF DATA CHANNELS OVER A SINGLE COMMUNICATIONS LINE

TECHNICAL FIELD

The present invention relates to data transfer methods and, more particularly, describes a multiplexed streaming protocol which allows the sending of multiple discrete channels of data over a single physical data transmission link.

BACKGROUND OF THE INVENTION

The advent of numerous private and commercial data storage and retrieval systems, commonly called hosts, has allowed persons with computers and modems to access information which would otherwise be unavailable or laborious to obtain. However, a single host frequently does not contain all of the information which a person may desire. Therefore, the person may have to access two or more hosts to obtain the desired information. In some cases, it may be necessary to repeatedly cross reference from one host to another host in order to obtain the desired information. Furthermore, after locating the desired information, the person may wish to transfer part or all of a data file from one host to another host in order to consolidate the information or update the second host. In the past, it has been necessary to terminate communications with the first host, dial up the second host, obtain the information, terminate the communication with the second host, dial up the first (or a third) host, obtain more information, etc. This is clearly a time consuming and inefficient procedure.

Data network services already exist which provide the user with access to more than one host, and CCITT Recommendations X.25 and V.42 and the LAP-M protocol provide a format whereby data is sent in the form of structured packets. A call request packet specifies the virtual circuit number. Once the virtual circuit (also sometimes referred to as a virtual channel) has been established the data is routed to a particular host or device by use of a virtual circuit number which is contained in the data packet. More and more, modem users are finding they can use packet-switched networks as a cost effective alternative to conventional long distance telephone calls. By connecting to a packet-switched network via a local phone call, a user can access national and even international networks. Packet-switching technology increases the overall system reliability since the network can accommodate a multitude of users by routing data in the most efficient manner and by bypassing equipment which might be out of service.

Therefore, once the user gains access to one of these networks, usually via a dial-up connection and a modem, the user may obtain information from selected ones of the hosts by sending a first query addressed to a first selected host, a second query addressed to a second selected host, etc. However, since the user accesses the network through a single modem, if the DTE does not have X.25 or LAP-M capability then the modem must have X.25 or LAP-M capability and, furthermore, the user must have a way of telling the modem that a particular query or piece of data is intended for a particular host.

Therefore, there is a need for a method whereby a user can specify or ascertain that a query or set of data is intended for or came from a particular host.

There is also a need for a method whereby data terminal equipment (DTE), such as a computer, can instruct data communication equipment (DCE), such as a modem, that a particular set of data is destined for a particular host in an attached network.

There is also a need for a method whereby data communication equipment can instruct data terminal equipment that a particular set of data has originated from a particular host in an attached network.

There is also a need for a method whereby a simple device can simultaneously communicate with two or more other devices over a plurality of virtual circuits.

Also, the different hosts may specify different compression schemes, encoding schemes, or other criteria. If only one PAD (Packet Assembler-Disassembler) is used then, to switch from one host to the next, the user will also have to reconfigure the PAD. Therefore, there is a need for an apparatus which has a plurality of independent PADs.

Generally, communications and control functions between a DTE and a DCE are accomplished by using the transmit data and receive data conductors, in conjunction with other conductors such as the data terminal ready (DTR) conductor, the ring indication (RI) conductor, the data set ready (DSR) conductor, etc. However, the usage of and particular function accomplished by these other conductors varies from device to device and from manufacturer to manufacturer. Therefore, there is a need for a communication and control protocol which can be effected using only the transmit data and receive data conductors.

Since multiple channels are to be transferred over a single data link, the transfer of a break signal, in its normal form, can noticeably reduce the effective data transfer rate for all channels. The effective data transfer rate could be improved if, rather than transferring the break signal in its original form, an indication of the break signal was transferred instead. In some protocols, the length of the break signal is of significance. Therefore, there is a need for a protocol which can provide an indication that a break signal has occurred and an indication of the length of the break signal.

SUMMARY OF THE INVENTION

Briefly described, the present invention is a protocol which allows a DTE and a DCE to indicate that a particular set of data is intended for or came from a particular host.

More particularly described, the present invention is a protocol which allows data to be assigned to a particular channel. The protocol provides for selection of a channel such that, after the selection is made, all subsequent data is automatically associated with that channel and a particular host until such time as a new channel is selected.

Also more particularly described, the present invention is an encoded protocol which does not preempt the use of certain characters or bit combinations in the data stream. The protocol provides that certain control characters, such as DC2 and DC4, will normally have a special meaning and that, when a control character appears in the data stream, it will be temporarily modified so that it will not be interpreted as a control character by the receiving device.

Also more particularly described, the present invention is a family of related protocols which can be used separately or in combination to provide enhanced functionality to a single physical communications link.

Also more particularly described, the present invention is a data communications device which has a plurality of independent PADs so that multiple independent data transfers can occur without requiring that a PAD be reconfigured.

Therefore, it is an object of the present invention to provide a method whereby a user can specify that a set of data is intended for a particular channel and a particular host.

It is another object of the present invention to provide a method whereby a DTE, such as a computer, can instruct a DCE, such as a modem, that a particular set of data is destined for a particular device in an attached network.

It is another object of the present invention to provide a method whereby a DCE can instruct a DTE that a particular set of data has originated from a particular device in an attached network.

It is a further object of the present invention to provide an encoded protocol which does not preempt the use of certain characters or bit combinations in the data string.

It is a further object of the present invention to provide a set of protocols which can be used to provide additional functions and features for a communications link.

It is a further object of the present invention to provide a data communications device which has a plurality of independent PADs.

It is a further object of the present invention to provide a method and an apparatus for carrying a plurality of independent data channels on a single data transmission link by providing a command that indicates that data flow is switching from one channel to another channel.

It is a further object of the present invention to provide a method whereby a single device can simultaneously communicate with two or more other devices over a plurality of virtual circuits.

It is a further object of the present invention to provide a command and data flow protocol which can be carried, along with data, on a data link consisting of only the transmit data conductor and the receive data conductor.

It is a further object of the present invention to provide a data control protocol which is compatible with other standard protocols.

It is a further object of the present invention to increase the effective data transfer rate by transferring an indication that a break signal has occurred and an indication of the length of the break signal instead of transferring the break signal in its original form.

It is a further object of the present invention to provide a communications and control protocol which can be used on any data link which provides at least 7 bits per character.

BRIEF DESCRIPTION OF THE DRAWINGS

FIG. 1 is a block diagram showing the preferred environment of the present invention.

FIG. 2 is an illustration of the word format used in the preferred embodiment of the present invention.

DETAILED DESCRIPTION

Figure 3:
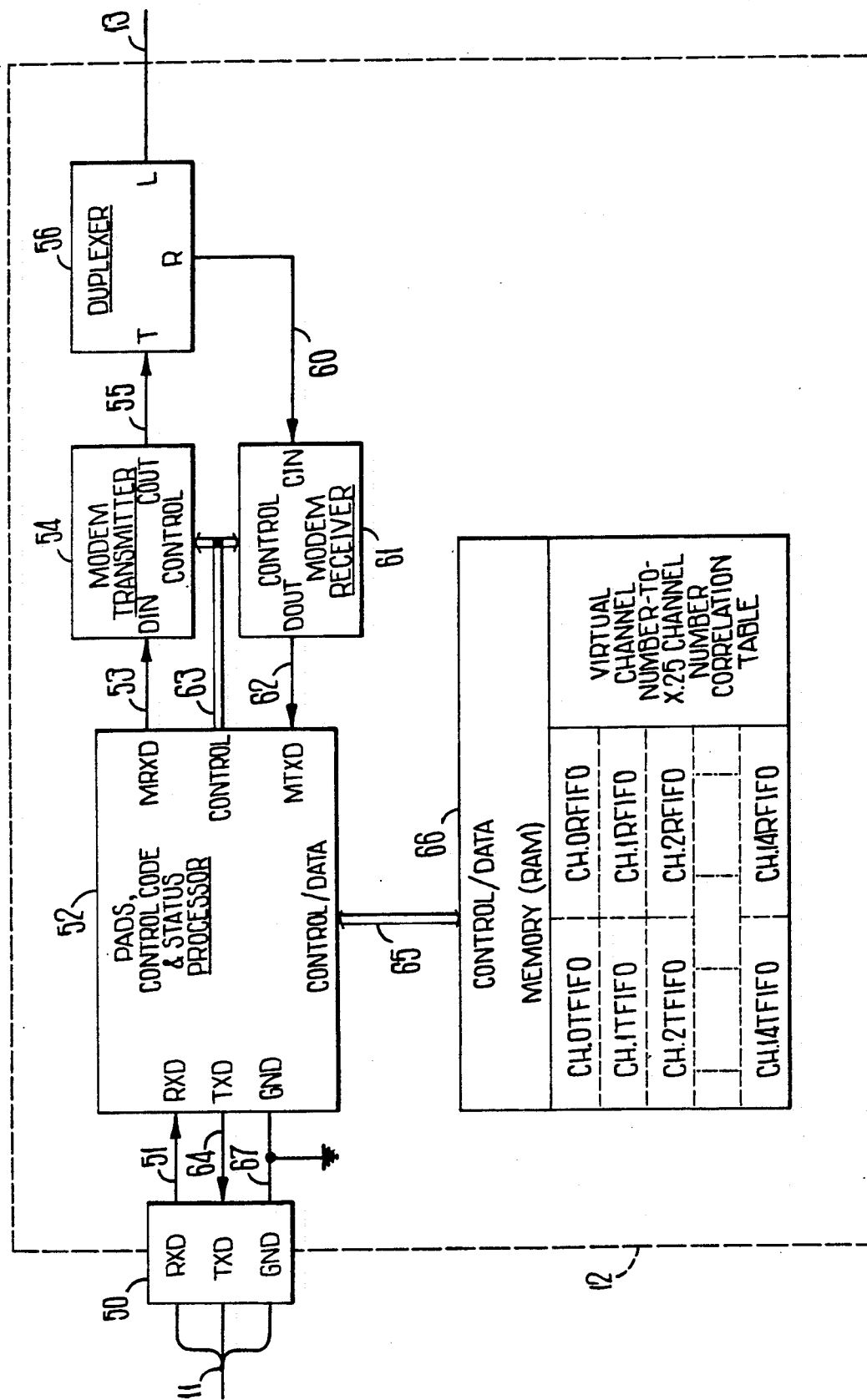
FIG. 3 is a block diagram of the preferred embodiment of the present invention.

Turning now to the drawing, in which like numerals represent like components throughout the several figures, the preferred embodiment of the present invention will be described. FIG. 1 is a block diagram of the preferred environment of the present invention. A DTE 10, such as a computer, is connected via a data bus 11 to a DCE 12, such as a modem. The data bus may be a serial data bus or a parallel data bus. In the preferred embodiment, data bus 11 is a serial data bus such as specified by RS-232C or EIA-232-D. DCE 12 communicates with another DCE 14, such as a modem, via a telephone line 13. DCE 14 is connected by signal path 15 to an X.25 NODE 16. X.25 NODE 16 is connected by a plurality of signal paths 17a-17n to a plurality of remote hosts 20a-20n, respectively. CCITT Recommendations X.25, V.42 and others specify the protocol for communications on signal paths 13, 15, and 17a-17n. The present invention is concerned with the protocol for communications between DTE 10 and DCE 12 on bus 11. The present invention requires only the use of the TX conductor, the RX conductor, and the signal return conductor of the bus 11. Any other conductors may be used, if desired, to coordinate and control other functions of DTE 10 and DCE 12.

The present invention is a method of sending multiple channels of asynchronous data over one physical link, such as bus 11. In its preferred environment, the present invention connects a DTE with a DCE or another device over a link 11 that is assumed to be sufficiently error free as to not warrant the inclusion of error detection and correction methods. Error control involves the sending of data in packets; the sending of data in packets increases the complexity of implementation, reduces the data throughput (the effective data transfer rate), and increases device propagation delay due to error checking. Since one of the design goals is to provide efficient protocols, the user data is not packetized and error control is not used between the DTE and the DCE. However, the present invention does not preclude the inclusion of error detection and correction methods in the protocol. Furthermore, in the preferred embodiment, a link status command is issued if a data overrun (channel buffer overflow) occurs. This controls the number of errors or bytes that must be retransmitted. For the purposes of this detailed description, physical link 11 is assumed to be an RS-232C or EIA-232-D bus but it will be appreciated that any point-to-point link capable of sending at least 7 bit data words may be used instead.

Turn now to FIG. 2 which is an illustration of the word format used in the preferred embodiment of the present invention. In the preferred embodiment, a data word may either be a 7 bit word with an even, odd, mark or space parity bit or an 8 bit word with no parity bit. The least significant bit is B0. The most significant bit will be either bit B6, if a 7 bit word is used, or bit B7 if an 8 bit word is used. Bits B0-B6 are designated by numerals 30-36, respectively. Parity bit/bit 7 is designated by the numeral 37. For convenience, instead of using different programming instructions for 7 or 8 bit words, the preferred embodiment of the present invention masks bit B7 and inspects only bits B0-B6 of the data.

The preferred embodiment is a family of character-oriented protocols that can be used separately or in combination to provide enhanced functions and features to a single communications link. There are two protocol types and, in addition, there is one extended protocol type. Protocol Type A provides for multiple data transfer paths or channels, independent flow control for each channel, and device flow control. Protocol Type B provides additional channel control and includes command/data transfer state switching, separation of user data and control information, provision of break signals, and forcing of data forwarding for packet mode devices. Protocol Type B1 is an extension to Protocol Type B, and provides a mechanism for transmitting, receiving, and processing qualified data packets in an X.25 PAD. The preferred embodiment has five levels, a level being defined as a meaningful combination of protocol types. The five levels and their associated protocol types are: level 1—type A; level 2—type B; level 3—types A and B; level 4—type B1; and level 5—types A and B1.

Table 1 depicts the Protocol Type A control codes and the meanings of the control codes. From Table 1 it will be seen that there are nine basic commands: XON, XOFF, link status, select channel N, flow off channel N, flow on channel N, and encoded XON, DC2, and XOFF characters. Flow control is implemented in two ways: device flow control; and channel flow control. The device flow control is implemented as XON/XOFF. Note that the protocol allows for encoding of XON/XOFF characters so that these characters may be used in a data stream without affecting the flow control. For example, assume that DTE 10 needed to cause DCE 12 to stop sending data to DTE 10. DTE 10 would then send the command 13 (hex), the XOFF command, which instructs DCE 12 to cease transmission to DTE 10. However, assume instead that DTE 10 needed to place the character XOFF into the data stream for transmission to one of the remote hosts 20. DTE 10 would send the command 12 (hex) 73 (hex) to DCE 12. This command advises DCE 12 that the XOFF control character is a data character and has been encoded. Therefore, it does not cause DCE 12 to cease transmission to DTE 10. However, before providing the data stream to modem 14 over telephone line 13, DCE 12 will convert the encoded XOFF character into the conventional XOFF character (13 hex). Therefore, DTE 10 has been able to send the XOFF character to the remote host without adversely affecting the operation of the DCE 12.

TABLE 1

| PROTOCOL TYPE A CONTROL CODES | |
|---|---|
| CODE (HEX) | MEANING |
| 11 | XON (DC1) |
| 13 | XOFF (DC3) |
| 12 (DC2) + 00 | Link Reset |
| 12 + 01 through 12 + 2F | Reserved |
| 12 + 3N | Select Channel N |
| 12 + 4N | FLOW OFF Channel N |
| 12 + 50 through 12 + 5F | Reserved |
| 12 + 6N | FLOW ON Channel N |
| 12 + 70 | Reserved |
| 12 + 71 | Encoded XON (DC1) |
| 12 + 72 | Encoded DC2 |
| 12 + 73 | Encoded XOFF (DC3) |
| 12 + 74 through 12 + 7F | Reserved |
| 12 + 80 through 12 + F0 | Reserved |
| 12 + F1 | Encoded 91 (hex) |
| 12 + F2 | Encoded 92 (hex) |
| 12 + F3 | Encoded 93 (hex) |

TABLE 1-continued

| PROTOCOL TYPE A CONTROL CODES | |
|---|---|
| CODE (HEX) | MEANING |
| 12 + F4 through 12 + FF | Reserved |

Notes:
1. N = 1,2 ... E (Hex)
2. Reserved codes are undefined and, until defined, cause a link reset.
3. 12 + 80 through 12 + FF are for use with an 8 bit code.
4. For convenience, it is assumed that the parity bit, if any, is always logic 0.

Rather than using codes 11 or 13 (XON or XOFF) respectively, which are device flow control characters, channel flow control (codes 12+4N, 12+6N) should be used whenever possible. The use of channel flow control, instead of device flow control, keeps one channel from stopping the data flow on the other channels.

For example, assume that DTE 10 has sent a query for information on channel 1 to remote host number 1 and a request for information on channel 3 to remote host number 2. Also assume that remote host number 1 is temporarily busy and cannot immediately respond to the request for information. However, remote host number 2 is available and begins sending a rather lengthy information document. Normally, since remote host number 2 has begun sending the information first then, as long as remote host number 2 continues to send information, the user would not be able to determine if remote host number 1 had answered the request. However, the present invention provides that DTE 10 may instruct DCE 12 to flow off channel 3, which is the channel dedicated to remote host number 2. Since channel 3 is now flowed off, remote host number 1 can transmit its response to the request for information over channel 1 to DTE 10. After remote host number 1 has completed transmission, the user can then cause DTE 10 to flow on channel 3 and allow remote host number 2 to complete the transfer of the information document.

The channel address for the flow control commands is obtained by evaluating bits 30-33. This allows for direct addressing of 14 data channels: channel 1 (0001) through channel 14 (1110). The code 0000 is used to terminate use of the protocol, and the code 1111 indicates a channel address extension, where the next byte is used to specify a channel number greater than 14. This extension byte is used to provide additional channel addressing capability for Protocol Type A. Bits 36 (MSB) through 30 (LSB) are evaluated as the address extension code. Bit 37 is not used and is ignored (marked off). Address extension codes 0 through 31 are not used since these codes are identical to ASCII control characters. An address extension code of 127 flags an address extension so that an additional byte is required to specify the extended channel number. This allows the number of channels to be extended as required. For the first extension byte, the channel number is obtained by subtracting 32 from the address extension code, and the address extension code is obtained by adding 32 to the channel number. Since codes 00 through 1F and code FF are not available to designate a channel number, each additional address extension byte only extends the number of channels which can be designated by 95. Some examples of Protocol Type A address codes/extension codes are: channel 1-31; channel 14-3E; channel 15-3F, 20; channel 16-3F, 21; channel 109-3F, 7E; channel 110-3F, 7F, 20; where the codes are in hex and, for convenience, it is assumed that the parity bit, if any, is always a logic 0.

Those familiar with the X.25 and V.42 protocols will appreciate that these protocols provide for individual device addressing. For example, assume that remote host 20a has been assigned device code number 1, remote host 20b has been assigned device code number 2, etc. For convenience of discussion, it will also be assumed that these device codes are unchanged as they pass through DCE 14. Also assume, for convenience, that DTE 10 and DCE 12 have assigned channel 1 to correspond to remote host 20a, assigned channel 2 to correspond to remote host 20b, etc. Assume now that DTE 10 has asked remote host 20a and 20b for some particular information and that these hosts have begun sending information. Now assume that DTE 10 decides that the data from remote host 20a is more pertinent or has a higher priority. DTE 10 would then send, to DCE 12, the command to flow off channel 2 (12+42 hex). This advises DCE 12 that DTE 10 wishes to stop receiving data on channel 2. Since DCE 12 can no longer send channel 2 data to DTE 10, the channel 2 buffer will begin to fill up. Consequently, DCE 12 would then, via telephone line 13 and DCE 14, and the X.25 or V.42 protocol, advise remote host 20b to cease data transmission. Then, when DTE 10 had finished receiving the data from remote host 20a, DTE 10 would issue the flow on channel 2 command (12+62 hex) which would allow DCE 12 to resume transmission on channel 2 to DTE 10. Once the channel 2 buffer had partially emptied then DCE 12 would advise remote host 20b to resume transmission of data.

The preferred embodiment of the present invention, which limits the control codes to two words, supports, not including channel 0, fourteen separate bidirectional data channels. Each channel may have any data format that includes at least 7 data bits. Since data may be sent over a typical bus using even, odd, or no parity, the control codes are also sent with even, odd, or no parity, as previously selected for communications between DTE 10 and DCE 12. Channel 0 is for conventional, non-multiplexed data transfers.

The link status command causes the device receiving the command to respond by sending its current transmit channel number and the flow control state of each of its receive channels. This command is used to verify that the communications link has been established between DTE 10 and DCE 12, determine the current active channel, and determine the number of supported channels. DCE 12 executes a link status upon initialization. In the preferred embodiment only a DTE 10 can send the link status command. The link status command is generally sent by DTE 10 upon detection of a receive error or other condition that indicates that the DTE and DCE are not communicating properly.

The reserved commands are currently undefined and, until defined, are ignored. This feature aids in the detection of errors. If the undefined codes were truly undefined then an error in a control word could produce an unexpected or undesired result. This feature allows for the product to be upgraded and additional commands provided by assigning a definition to previously reserved words. The new commands will cause the desired result in upgraded products and will simply be ignored older products.

If, for some reason, a plain data link which does not interpret the protocol command and control bytes is desired then a select channel 0 (link disconnect) command should be sent. The device receiving the command will respond by returning to the single channel (non-streaming) mode of operation. If the receiving device is a DCE it will also send the select channel 0 sequence before entering the single channel link mode. This allows the interrupting DTE to determine when the end of the streaming data occurs by monitoring for the answering select channel 0 sequence. If the receiving device is a DTE it should not send the answering select channel 0 sequence since this could cause the DCE to again send the answering channel 0 sequence and lead to an infinite series of answering channel 0 sequences. Of course, if desired, the answering select channel 0 sequence could be a different code, such as 12+70 (hex). This would permit the receiving device, whether a DTE or a DCE, to always answer the select channel 0 sequence.

Note that all control codes, with the exception of the device flow control commands XON and XOFF, begin with the DC2 character (12 hex). If the value 11, 12 or 13 (hex) is required in the data, DC2 followed by a special byte must be sent. In the preferred embodiment, only the lower 7 bits of a word are inspected. It will be noted that 12 (hex) corresponds to the control character DC2, and the lower 7 bits of 92 (hex) also correspond to the DC2 control character. Similarly, codes 91 and 93 appear as XON and XOFF. Therefore, if the value 91, 92, or 93 (hex) is required in the data, DC2 followed by a special byte must be sent. This approach prevents binary data or an 8 bit data word from accidentally resembling a DC2, XON or XOFF control code and causing an unexpected or undesired result. Therefore, if an 8 bit code is used, such as the ASCII 8 bit word format, the 8 bit words 91, 92, and 93 (hex) are encoded in the same manner as 11, 12 and 13 (hex), respectively, but with the exception that bit 7 is a logic 1. Therefore, the present invention accommodates both 7 and 8 bit data streams.

Changing the data from one data transmission channel to another data transmission channel is accomplished by sending a select channel N control code. For example, if DCE 12 were to send data to DTE 10 on channel 3, then channel 1, then channel 2, DCE 12 would send the hex control code 12+33 followed by the data for channel 3, 12+31 followed by the data for channel 1, and 12+32 followed by the data for channel 2.

Table 2 illustrates a sample session between a DTE and a DCE. This sample session is merely intended to provide an example of what a DTE/DCE exchange might comprise and is not intended to be limiting. In step 1, the DTE sends the link status command. In response to the link status command the DCE advises the DTE of the status of all the channels which it supports and indicates the channel which is currently selected. For the purpose of this example, it is assumed that the current transmit channel is 1, caused by a previous Select Channel 1 command or a powerup default setting. In this case, steps 2-6 indicate that the DCE supports channels 1 through 4, channels 1, 2, and 4 are flowed on, channel 3 is flowed off, and the current transmit channel is 1. In steps 7 and 8 the DTE flows off channel 1 and then, since channel 1 is the current transmit channel, as indicated by step 6, the DTE sends the data string "This Is A". Note that the DCE cannot respond since channel 1 is the current transmit channel but the DTE has flowed off channel 1. However, in step 9, the DTE flows on channel 1. Therefore, in step 10, assuming that the DCE is set to echo, the DCE then echos the data "This Is A". In steps 11 and 12 the DTE selects channel 2 and sends the data "Sample Session". In step 13, the DCE accordingly selects channel 2, since that is the channel upon which data was sent by the DTE, and then, in step 14, echos the data "Sample Session". Although the limitation on the illustration of Table 2 may cause Table 2 to suggest that a half-duplex operation is used, there is no such constraint on the present invention. That is, the present invention encompasses both half duplex and full duplex communications.

TABLE 2

SAMPLE SESSION

| STEP | DEVIDE | CODE (Hex) or Data | MEANING |
|---|---|---|---|
| 1 | DTE: | 12+00 | Link status |
| 2 | DCE: | 12+61 | FLOW ON CH.1 |
| 3 | | 12+62 | FLOW ON CH.2 |
| 4 | | 12+43 | FLOW OFF CH.3 |
| 5 | | 12+64 | FLOW ON CH.4 |
| 6 | | 12+31 | Select CH.1 [DCE supports Channels 1 through 4. Channels 1,2, and 4 on Flowed ON, Channel 3 is Flowed OFF, Current is Channel 1.] |
| 7 | DTE: | 12+41 | FLOW OFF CH.1 |
| 8 | DTE: | "This Is A" | DATE: "This Is A" |
| 9 | DTE: | 12+61 | FLOW ON CH.1 |
| 10 | DCE: | "This Is A" | Assuming it is set to echo, DCE echos the data "This Is A" |
| 11 | DTE: | 12+32 | Select CH.2 |
| 12 | DTE: | "Sample Session" | DATA: "Sample Session" |
| 13 | DCE: | 12+32 | Select CH.2 |
| 14 | DCE: | "Sample Session" | Assuming it is set to echo, DCE echos the data "Sample Session" |
| 15 | DTE: | 12+34 | Select Channel 4 |
| 16 | DTE: | "Another Session" | DATA: "Another Session" |
| 17 | DTE: | 12+71 | Encoded "XON" character in data stream |

In step 15, the DTE selects channel 4, and then, in step 16, sends the data stream "Another Session". In step 17, the DTE sends, as data, the encoded "XON" character.

From the above, it will be seen that the present invention provides a method of selecting a particular one of a set of virtual data channels and sending data over these channels so that data sent on a particular channel will eventually be routed to a predetermined device. The present invention also provides for a means of encoding certain control characters when they appear in the data stream so that these control characters do not cause undesired results and may still be transmitted, in a modified form, as part of a data stream between the DTE and the DCE.

Consider now the operation of the preferred embodiment of the present invention in its preferred environment. Table 3 is an example of a typical communication procedure. Assume that connected to the X.25 node there are three hosts: host 20a, a banking service, assigned host device number 134; host 20b, a financial service, assigned device number 291; and host 20c, a news service, assigned device number 176. The device numbers are assigned by the X.25 network controller (not shown). In step 1 the user has, via DTE 10, instructed modem 12 to seize telephone line 13 and dial up the X.25 network. Assume now that the two modems 12 and 14 have been connected, have completed handshaking, and that the user at DTE 10 desires to access these three hosts. In step 2 the user instructs DTE 10 to access a first service, for example, banking, by typing in the command "CALL IDAD1,,VCN", where ID represents the network ID code, AD1 represents the banking service address (134) on that particular network, and VCN represents the desired virtual channel number. The VCN number also designates the PAD which will handle the communications. PAD 1 handles communications on channel 1, PAD 2 handles communications on channel 2, etc. If VCN is not specified, the last channel in use will be presumed to be selected or, if no last channel information is available, then channel 1 will be selected. DTE 10 will send this instruction to DCE 12 which will establish connection with the device having the address AD1 on the network labeled ID. In this case, that will be the banking host 20a. DCE 12 will use virtual channel 1 for communication between DTE 10 and DCE 12 and, for communications between DCE 12 and device AD1, will use X.25 channel K1, channel K1 being the logical channel number specified by the X.25 network controller. After establishing connection, DCE 12 enters the PAD online state.

In step 3 data is then be transferred between DTE 12 and host 20a (device AD1) via DCEs (modems) 12 and 14. It should be remembered that certain characters must be encoded before being sent between DTE 10 and DCE 12, as explained above and as shown in Table 2 above. Assume now that the user desires to access the finance service provided by host 20b. In step 4 the user presses the "DLE" key and the "2" key. This causes DTE 10 to send the hex code 12, 32 to DCE 12. It will be recalled that the code 12, 32 is the command to switch to channel and PAD 2. This causes DTE 10 and DCE 12 to switch, after completion of any remaining data transfers, from virtual channel and PAD 1 to virtual channel and PAD 2 and to enter the PAD command state. In step 5 the user enters "CALL IDAD2". DCE 12 then establishes contact with the device having address AD2 (finance host 20b) and enters the PAD online state. In the preferred embodiment, whenever a command is issued which causes any PAD to change states, i.e., enter the command state or enter the online state, all PADs change state. The X.25 network controller will assign another logical channel number, K2, for the connection between DCE 12 and host 20b. DCE 12 maintains a correlation table between the PAD virtual channel number and the X.25 network logical channel number so that the data transferred to/from DTE 10 is always routed from/to the appropriate host 20a–20c. In step 6, data is transferred between DTE 10 and host 20b.

TABLE 3

EXAMPLE OF PROCEDURE

| STEP NO. | KEYBOARD ENTRY | RS232 DATA | DCE ACTION/ RESPONSE |
|---|---|---|---|
| 1. | ATDTnnnnnnn CR# | Same | Seize line, dial number, establish connection, send PAD prompt character, enter PAD |

TABLE 3-continued

EXAMPLE OF PROCEDURE

| STEP NO. | KEYBOARD ENTRY | RS232 DATA | DCE ACTION/ RESPONSE |
|---|---|---|---|
| | | | command state. |
| 2. | Call IDAD1,, VCN CR# | Same | Establish connection with device having address AD1 on network ID. Use PAD channel VCN between DTE and DCE. Use X.25 Channel K1 (specified by X.25 network) between DCE and device AD1. Enter PAD online state. |
| 3. | [DATA] | [DATA]* | Transfer data to/from device AD1. |
| 4. | DLE 2 CR# | DC2 32 | Switch to PAD channel 2. Enter PAD command state. |
| 5. | Call IDAD2 CR# | Same | Establish connection with device AD2 on network. Use Pad channel 2 between DTE and DCE. Use X.25 channel K2 (specified by X.25 network) between DCE and device AD2. Enter PAD online state. |
| 6. | [DATA] | [DATA]* | Transfer data to/from device AD2. |
| 7. | DLE 4 CR# | DC2 34 | Switch to PAD channel 4. Enter PAD command state. |
| 8. | Call IDAD3 CR# | Same | Establish connection with device AD4 on network. Use PAD channel 4 between DTE and DCE. Use X.25 channel K3 (specified by X.25 network) between DCE and device AD3. Enter PAD online state. |
| 9. | [DATA] | [DATA]* | Transfer data to/from device AD3. |
| 10. | DLE CR# | DLE | Switch to PAD command state. |
| 11. | EXIT CR# | EXIT | Switch to AT command state. |
| 12. | ATH0 CR# | Same | Hang up telephone line. |

CR# = Carriage Return
*If [DATA] between the DTE 10 and DCE 12 is to contain the character DLE, the character is sent twice, i.e., DLE, DLE.

As shown in steps 7-12, the user may gain access to host 20c, return to host 20a, etc. Therefore, the user, via a single dial-up connection, has simultaneous and independent access to a plurality of host systems 20a-20n. Furthermore, encoding of certain characters allows the complete set of ASCII characters to be used and also allows for the transfer of binary data since, by using the protocol of the present invention, it can be readily ascertained whether a character is a data character or is a command character. Note also that the present invention provides an encoded interface between DTE 10 and the X.25 network so that commands intended for the X.25 network can be sent through DCE 12 without being interpreted by DCE 12 as commands. Likewise, commands intended for DCE 12 are intercepted and acted upon by DCE 12 and prevented from reaching the X.25 network.

Protocol Type B provides signaling to distinguish between user data and control data (commands and responses), to force a channel into the command state, and to generate a variable length break signal. Protocol Type B is also a 7 bit protocol and bit 37 (FIG. 2) is ignored. The signal or lead in character for Protocol Type B is DC4 (14 hex). Therefore, if a character having a value of either 14 or 94 (hex) is received, then the next character will be treated as a Protocol Type B instruction and not as user data. If a character whose value is either 14 or 94 (hex) is to be sent as user data, that character must be encoded. Encoding is done in a manner similar to that for the DC1, DC2 and DC3 codes in Protocol Type A. Encoded values 14 and 94 (hex) are shown in Table 4. Use of values 0 through 1F (hex) should be avoided if possible since these values correspond to ASCII control codes.

Table 4 lists the Protocol Type B and B1 control codes. Protocol Type B supports three commands plus two encoded characters. Protocol Type B1 supports all of the functions of Protocol Type B and provides two additional functions. It will be noted that a code may have a different meaning dependent upon whether it is transmitted or received by modem 12. Also, some codes, such as the control data/channel escape code, indicate that a range of values are reserved. However, the transmitting device will always send the first code listed by setting bits 30-33 to zero, and the receiving device will always respond to the entire range of values by ignoring bits 30-33.

TABLE 4
PROTOCOL TYPES B AND B1 CONTROL CODES

| TYPE | CODE (HEX) | MEANING (Sent by DCE/ Received by DCE) |
|---|---|---|
| B | 14 (DC4) + 00 through 14 + 1F | Reserved |
| B | 14 + 20 (through 14 + 2F) | Control Data/Channel Escape |
| B1 | 14 + 30 (through 14 + 3F) | Q-BIT Data/Forward Q-BIT Data |
| B | 14 + 4M + 4N | Indication of Break Signal |
| B | 14 + 50 (through 14 + 5F) | Data Element Boundary/ Forward Data |
| B1 | 14 + 60 (through 14 + 6F) | /Process Q-BIT Data |
| B | 14 + 70 through 14 + 73 | Reserved |
| B | 14 + 74 | Encoded DC4 |
| B | 14 + 75 through 14 + 7F | Reserved |
| B | 14 + 80 through 14 + F3 | Reserved |
| B | 14 + F4 | Encoded 94 (HEX) |
| B | 14 + F5 through 14 + FF | Reserved |

The control data code, sent by the DCE to the DTE, indicates that data other than user data follows, such as PAD service signals or AT command result codes. When the control data message is complete, the data element boundary code shall be transmitted by the DCE, and user data is assumed to follow.

When received by the DCE, the channel escape code escapes the channel from the data transfer state. In the case of an X.3 PAD, the action is the same as the PAD recall character, that is, it forces the PAD into the command state. In the case of an AT command processor, the code forces the DCE into the command state, as if the DCE had received the escape sequence described in U.S. Pat. No. 4,549,302. If the channel does not implement a command state, then this code will be ignored by the DCE. The DCE will also exit the online or data transfer state and enter into the PAD command state if the carrier is lost or if the remote device 14 clears the virtual connection, or if DTE 10 issues a break signal of at least a predetermined duration.

When transmitted by the DCE, the indication of break signal indicates that the DCE has received a break signal of the specified duration from remote device 14. When received by the DCE, the code causes the DCE to send to the remote device 14 a break signal of the specified duration. Bits 33–30 of the second byte (4M) form the higher four bits of the break duration and bits 33–30 of the third byte (4N) form the lower four bits of the break duration. The break length resolution is 0.01 second. Therefore, this code can indicate reception of or cause generation of a break signal having a period between 0 and 2.55 seconds.

When transmitted by the DCE, the data element boundary code marks the end of a data element. A data element is defined as a complete entity or block of data. For example, a sequence of three X.25 data packets in an M-bit sequence constitutes one data element. Data transmitted subsequent to a data element boundary code is assumed to be user data, unless marked otherwise, such as by the control data code.

The reception of the forward data code by the DCE causes any data that is buffered in a channel memory (FIFO) to be immediately placed on the telephone line or data link 13, subject to any flow control signals provided by DCE 14. If the DCE is not in the packet mode, then the reception of the data forwarding code will have no effect and will be ignored by the DCE.

Codes for the encoded DC4 character and the encoded 94 (hex) value are also shown in Table 4.

The Protocol Type B1 extension provides a method for the application software (the driver in DTE 10) to process X.25 qualified data (Q-bit) packets. In this mode, a qualified data packet received from the remote DCE (14) is transmitted by DCE 12 to DCE 10 in ASCII hexadecimal format preceded with the Q-bit data code, instead of being processed by the PAD in DCE 12. Qualified data packets can be sent to the remote PAD in DCE 14 by preceding the qualified data with the Forward Q-bit data code. If the PAD for DCE 12 is to process a qualified data packet, usually received from DCE 14, the data packet should be preceded with the process Q-bit data code.

Transmission of the Q-bit data code by the DCE indicates that qualified (Q-bit) data follows. This code is always sent when a qualified data packet is received from the remote device 14. Furthermore, the data element boundary code, described above, is sent at the end of the Q-bit data element to indicate that Q-bit data transmission is completed. Multiple Q-bit data packets in an M-bit sequence are considered to be one data element. If a data element boundary code has been sent and more qualified data is present, the Q-bit data code should follow the data element boundary code and precede the additional qualified data.

After the transmission of the data element boundary code by the DCE no further data will be transmitted to the DTE by the DCE until the DCE has received a complete qualified data message from the DTE. This allows the DTE to process the qualified data message before the PAD processes any further user data from the remote device 14. For example, the qualified data message may have been a "SET PAD" message from the remote device 14 and could have altered the way the PAD would deliver subsequent user data. Normally, receipt of an X.25 set, read, or set and read PAD message is a data forwarding condition. When protocol type B1 is active, Q-bit packets received from the remote device 14 are not decoded by the PAD. These data forwarding conditions must be handled by the DTE.

Each octet of the Q-bit packet is transmitted in the form of a pair of ASCII hex digits using the characters "0" through "9" and "A" through "F". The pair of digits is transmitted by the device in a stream and does not include spaces or separator characters.

The reception of the Forward Q-bit data code by the DCE indicates that qualified data packets follow and that the data should be immediately forwarded, the same as the reception of the Protocol Type B for data code. Data received from DTE 10 while assembling the Q-bit packet(s) are expected to be in the form of ASCII hex digit pairs, using the characters "0" through "9", "A" through "F", and "a" through "f". Data received which does not meet this character requirement will be discarded by the PAD.

The Process Q-bit data code, when received by the DCE, is a data forwarding code and causes the device to send the next packet (or M-bit sequence) generated with the Q-bit set, to the device's Q-bit packet handler (X.29) for processing as if it had been received from the remote device 14. This allows the DTE 10 to send a Q-bit packet to DCE 12 so that DCE 12 will process the packet and then return the processed packet to DTE 10. Data received from the DTE 10 while assembling the Q-bit packet(s) are expected to be in the same form as that described for the Q-bit forward code.

Turn now to FIG. 3 which a block diagram of the preferred embodiment of the present invention as implemented in a modem such as DCE 12. Connector 50, such as an RS-232C connector, has at least a transmit data (TXD) connection, a receive data (RXD) connection and a signal ground (GND) connection. The TXD and RXD connections are connected by conductors 51 and 67, respectively, to the RXD input and the TXD output, respectively, of a control code and status processor 52. The multiple PADs are implemented in control code and status processor 52. Control code and status processor and PAD 52 provides a modified RXD signal, via its MRXD output and conductor 53, to the data input (DIN) of a modem transmitter 54. Transmitter 54 uses the incoming data on conductor 53 to produce a modulated data carrier corresponding to the input data on conductor 53. The modulated data carrier output (COUT) of transmitter 54 is connected to the transmitter (T) input of duplexer 56. The bidirectional line (L) port of duplexer 56 is connected to telephone line 13.

The receive (R) output of duplexer 56 is connected by conductor 60 to the modulated data carrier input (CIN) of a modem receiver 61. Receiver 61 demodulates the incoming data carrier to provide a data stream, at its data output (DOUT) port, corresponding to the data contained in the incoming modulated data carrier signal on conductor 60. The DOUT output of receiver 61 is connected by conductor 62 to the MTXD input of PADs and control code and status processor 52. Processor 52 provides, via its transmit data output (TXD) and conductor 64, a modified TXD signal to the TXD connection of RS-232C connector 50.

The control port of processor 52 is connected by conductor 63 to the control ports of transmitter 54 and receiver 61. A control/data bus 65 connects processor 52 to a random access memory (RAM) 66. In the preferred embodiment, RAM 66 may be considered as being divided into at least three sections: transmit first in-first out (FIFO) registers; receive FIFO registers; and a virtual channel number (VCN)-to-X.25 channel number cross-reference table. The 15 transmit registers (CH.0TFIFO-CH.14TFIFO) and the 15 receive registers (CH.0RFIFO-CH.14RFIFO) are used for the temporary storage of data. In the preferred embodiment, each of these registers has a capacity between 500 and 3,000 bytes.

Although fourteen PADs and virtual channels are provided in the preferred embodiment, the present invention is not limited to fourteen. Additional PADs and virtual channels can be easily provided if desired or required.

Consider now the processing of data sent from DTE 10 to DCE 12 for transmission over telephone line 13. For purposes of this discussion, it will be assumed that DCE 12 is in the online mode of operation and that Level 1 Operation (Protocol Type A) has been selected. The incoming data on RXD conductor 51 is inspected by processor 52 to determine if an escape sequence, an XON character, an XOFF character, a DC2 character or an 8 bit ASCII character corresponding to 91, 92, or 93 (hex) is present. If the escape sequence is present processor 52 enters into the command state. The use of escape sequences is now well known to those skilled in the art. In the preferred embodiment, control code and status processor 52 is responsive to the escape sequence described in U.S. Pat. No. 4,549,302. If the XOFF character is present then processor 52 will cease the transmission of data over TXD conductor 64. If the XON character is present then processor 52 will resume or continue transmission of data on TXD conductor 64.

If the DC2 character is present then processor 52 will inspect the following byte to determine the proper course of action. This following byte, as described above, may indicate that processor 52 is to select a particular PAD/channel, to turn on or turn off a particular PAD/channel, to decode that byte, or to enter the single channel mode (select channel 0). Characters which are not control characters and bytes which have been decoded are placed by processor 52 into the receive FIFO (RFIFO) for the selected data channel. For example, if PAD/channel 1 has been selected, the data will go into CH.1RFIFO. The data is subsequently read out of the FIFO and provided, as part of a X.25/LAPM data packet, to transmitter 54. CCITT Recommendation X.25 specifies that a data packet contain a virtual circuit number to route the data to its proper destination after transmission over telephone line 13. However, the channel designations used between DTE 10 and DCE 12 do not necessarily correspond to the virtual circuit numbers used between processor 52 of DCE 12 and the X.25 network connected to the other end of telephone line 13. Processor 52 therefore maintains the correlation table between the channel number selection (between DTE 10 and DCE 12) and the X.25 virtual circuit number.

Data received by DCE 12 via telephone line 13 is routed into the transmit FIFO (TFIFO) for the appropriate data channel. The data is then read out of the appropriate FIFO, e.g., CH.1TFIFO, and inspected for the presence of the XON, XOFF, DC2 or 91, 92 or 93 (hex) characters. If these characters are present then they are encoded, as described above, prior to being placed upon TXD conductor 64 for transmission to DTE 10.

Although the preferred embodiment has been described as utilizing an RS-232C bus 11, it will be appreciated that the present invention is not so limited. For example, data could also be transferred to/from a parallel data bus by means of a universal asynchronous receiver transmitter (UART) (not shown) to interface between the parallel data bus and bus 11. It is also possible to transfer data between processor 52 and a parallel data bus through a buffer (not shown).

In the preferred embodiment, telephone line 13 is a conventional analog telephone line and therefore modem transmitter 54 converts data signals (DIN) into an analog form suitable for transmission on telephone line 13. Likewise, modem receiver 61 receives the signals from telephone line 13 and demodulates these signals to provide a serial data stream (DOUT). However, the present invention is not limited to use with conventional analog telephone lines. The present invention also lends itself for use with ISDN telephone lines, in which case modem transmitter 54 would convert the DIN signals into a format suitable for transmission over ISDN telephone line 13, and modem receiver 61 would convert the received ISDN signals on telephone line 13 into the serial data stream DOUT.

Figure 4A:
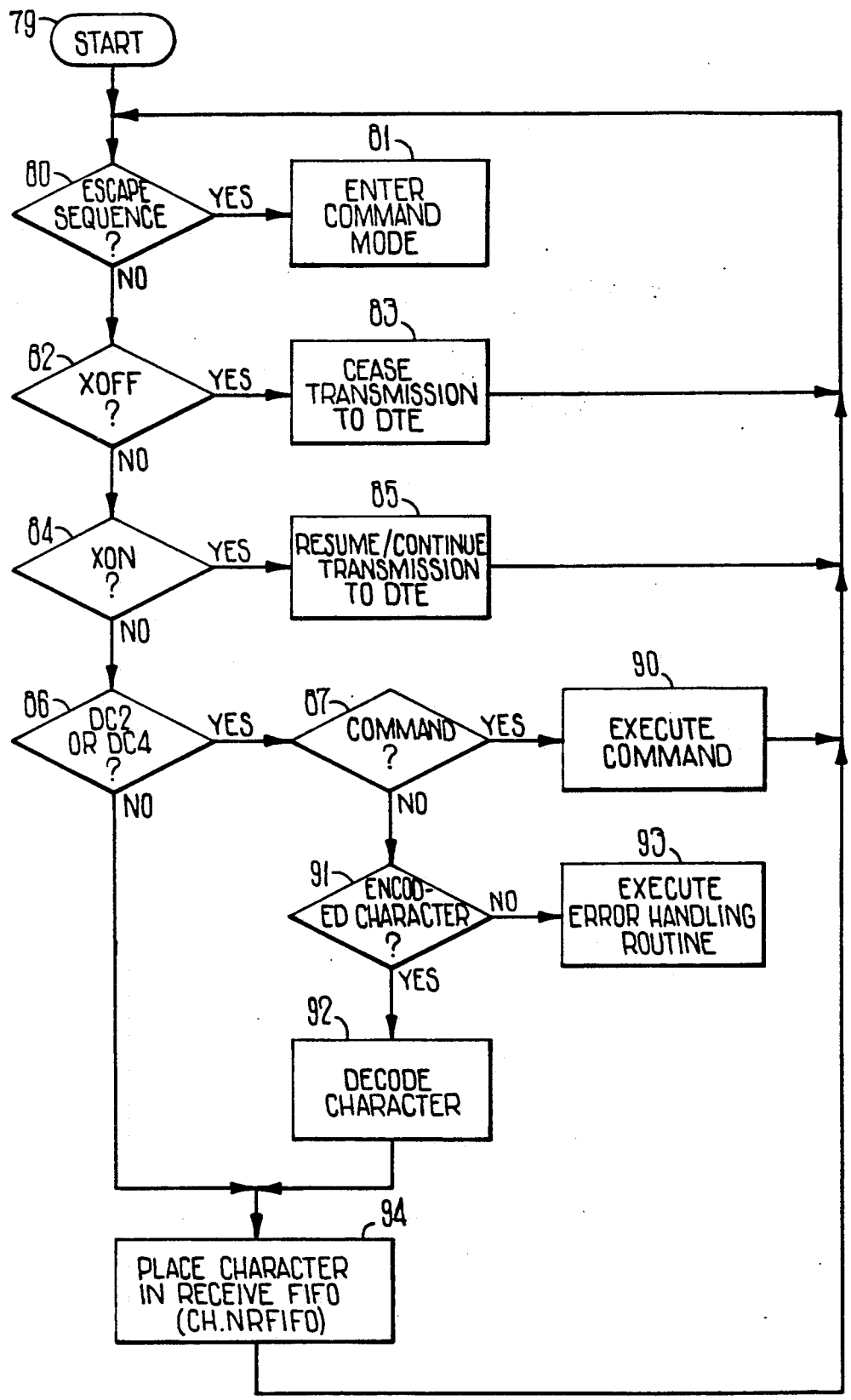
FIGS. 4A and 4B are a flow chart of the operation of the transmission and receive functions of the preferred embodiment.
Figure 4B:
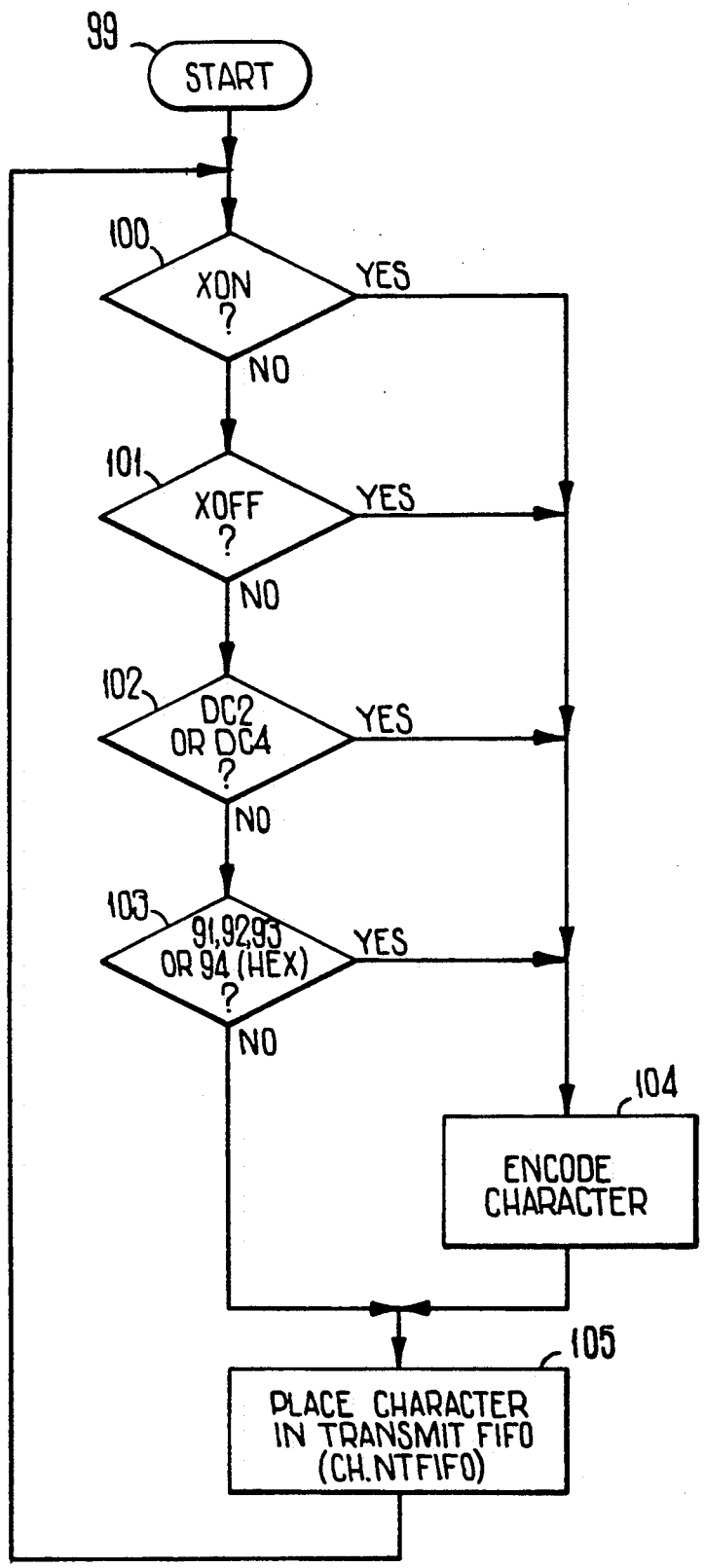

Turn now to FIGS. 4A and 4B which constitute a flow chart representative of the operation of the receive and transmit functions, respectively, of the preferred embodiment for Protocol Type A operation. The steps of FIGS. 4A and 4B are performed by processor 52. FIG. 4A corresponds to data received from DTE 10 and FIG. 4B corresponds to the processing of data received over telephone line 13.

In decision 80, processor 52 determines whether the incoming data corresponds to the escape sequence. If so, processor 52 enters 81 the command mode of operation and remains there until an online command is entered. If not, processor 52 proceeds to decision 82 and tests whether the character is the XOFF character. If so, processor 52 ceases 83 transmission to the DTE and then returns to decision 80. If not, processor 52 proceeds to decision 84 and determines whether the character is the XON character. If so, processor 52 resumes or continues 85 transmission to the DTE and then returns to decision 80. If not, processor 52 proceeds to decision 86 and determines whether the character is the DC2 character or the DC4 character. If so, processor 52 then determines 87 whether the next character corresponds to a command. If so, processor 52 executes 90 the command and returns to decision 80. If not, then processor 52 determines 91 whether the next character is an encoded character. If not, then processor 52 executes 93 the error handling routine since any character which follows a DC2 character or a DC4 character must be either a command character or an encoded character. If the character is an encoded character, then processor 52 decodes 92 the character and then places 94 the character in the receive FIFO for the selected channel, e.g., CH. 2 RFIFO. If the character is not the escape sequence, not the XOFF, not the XON character, not a DC2 character, and not a DC4 character, then it is placed 94 in the receive FIFO for the selected channel. Characters placed in the receive FIFO are later read by processor 52, assembled into packets and then provided to the modem transmitter 54. In the preferred embodiment, processor and PADs 52 will store the data in the receive FIFO for a particular channel and will only send that data to modem transmitter 54 when a complete packet or packets have been assembled.

Data received from the modem receiver 61 is processed according to FIG. 4B before being placed in the receive FIFO for the appropriate channel. Processor 52 determines whether the data character is the XON character in decision 100, the XOFF character in decision 101, the DC2 character or the DC4 character in decision 102, or 91, 92, 93, or 94 (hex) in decision 103. If so, processor 52 encodes 104 the data character and then places 105 the character in the transmit FIFO for the appropriate channel, e.g., CH. 2TFIFO. If the character is not one of the above characters, then processor 52 places 105 the character in the transmit FIFO. Data placed in the transmit FIFO for a particular channel is later read by processor 52 and then provided to DTE 10 via the TXD connection of connector 50. In the preferred embodiment, data is only read from the transmit FIFO for a particular channel and provided to DTE 10 when a complete packet or packets has been assembled in the FIFO.

Although described in the context of an X.25 network, the present invention is not limited thereto. The present invention also is useful in DTE-DTE data transfers whereby different data streams, e.g., different documents, may be identified and differently processed by referencing the virtual channel numbers on which the data stream appears.

From the above, it will be appreciated that the present invention provides a multiplexed streaming protocol, method, and apparatus whereby a DTE and a DCE can simultaneously communicate with a plurality of hosts connected to a X.25 network. The present invention also provides for encoding predetermined characters so that these characters may be selectably used as either data characters or control characters. From the detailed description and accompanying drawings numerous modifications, alterations, and alternative embodiments of the present invention will become apparent to those skilled in the art. Therefore, the present invention is be limited only the claims below.

We claim:

1. In a data transfer system containing a data terminal equipment (DTE) and a data communications equipment (DCE), a method for sending commands and data from said DTE to said DCE, comprising the steps of:
   (A) defining a plurality of data channels for transferring said data from said DTE to said DCE, only a single data channel of said plurality of data channels being selected at any time;
   (B) performing a data transfer procedure comprising:
      (1) identifying a predetermined data channel by which said data is to be transferred;
      (2) if said predetermined data channel is not enabled then delaying the transfer of said data until said predetermined data channel has been enabled by said DCE;
      (3) if said predetermined data channel is enabled but not selected then selecting said predetermined data channel;
      (4) inspecting each character of said data to be sent to said DCE;
      (5) if said character is not one of a predetermined set of characters, then sending said character to said DCE;
      (6) if said character is one of said predetermined set of characters then generating a first character corresponding to said character, sending the ASCII character DC2 to said DCE, and sending said first character to said DCE; and
   (C) performing a command procedure comprising:
      (1) sending said DC2 character to said DCE; and
      (2) performing at least one of the following: sending a code AN, where A is a predetermined value and N is a channel number, to enable channel N, sending a code BN, where B is a predetermined value, to select said predetermined channel, and sending at least one character of a command to said DCE.

2. The method of claim 1 wherein said predetermined set comprises the ASCII characters DC2, XON and XOFF.

3. The method of claim 2 wherein said first character is the ASCII character R when said character of said data is the ASCII character DC2.

4. The method of claim 2 wherein said first character is the ASCII character S when said character of said data is the ASCII character DC3 (XOFF).

5. The method of claim 2 wherein said first character is the ASCII character Q when said character of said data is the ASCII character DC1 (XON).

6. The method of claim 1 wherein said command procedure further comprises sending a code CL to said DCE, wherein C is a predetermined value indicating a break signal, and L indicates the duration of said break signal.

7. In a data transfer system containing a data terminal equipment (DTE) and a data communications equipment (DCE), a method for receiving commands or data sent to said DCE from said DTE, comprising the steps of:
(A) inspecting each character of said data received from said DTE;
(B) if said character is the ASCII character DC2, then inspecting a next character of said data;
   (i) if said next character is one of a predetermined set of characters, then generating a first character corresponding to said next character, and treating said first character as data from said DTE;
   (ii) if said next character is the code AN, where A is a predetermined value and N is a channel number, then enabling data channel N;
   (iii) if said next character is the code BN, where B is a predetermined value, and said data channel N has been enabled by said DCE, then identifying said data channel N as a selected data channel;
   (iv) otherwise, treating said next character as a command character; and
(C) if said character is not the ASCII character DC2, then treating said character as data from said DTE on a data channel which has been enabled by said DCE and which was last selected by said DTE.

8. The method of claim 7 wherein said predetermined set comprises the ASCII characters Q, R, and S.

9. The method of claim 8 wherein said first character is the ASCII character DC2 when said character of said data is the ASCII character R.

10. The method of claim 8 wherein said first character is the ASCII character DC3 (XOFF) when said character of said data is the ASCII character S.

11. The method of claim 8 wherein said first character is the ASCII character DC1 (XON) when said character of said data is the ASCII character Q.

12. The method of claim 7 and further comprising the following step between step (A) and step (B) (iv):
if said next character is the code CL, wherein C is a predetermined value, then responding as if a break signal of duration L had been received.

13. In a data transfer system containing a data terminal equipment (DTE) and a data communications equipment (DCE), a method for sending commands and data from said DCE to said DTE, comprising the steps of:
(A) defining a plurality of data channels for transferring said data from said DCE to said DTE, only a single data channel of said plurality of data channels being selected at any time;
(B) performing a data transfer procedure comprising:
   (1) identifying a predetermined data channel by which said data is to be transferred;
   (2) if said predetermined data channel is not enabled then delaying the transfer of said data until said predetermined data channel has been enabled by said DTE;
   (3) if said predetermined data channel is enabled but not selected then selecting said predetermined data channel;
   (4) inspecting each character of said data to be sent to said DTE;
   (5) if said character is not one of a predetermined set of characters, then sending said character to said DTE;
   (6) if said character is one of said predetermined set of characters then generating a first character corresponding to said character, sending the ASCII character DC2 to said DTE, and sending said first character to said DTE; and
(C) performing a command procedure comprising:
   (1) sending said DC2 character to said DTE; and
   (2) performing at least one of the following: sending a code AN, where A is a predetermined value and N is a channel number, to enable channel N, sending a code BN, where B is a predetermined value, to select said predetermined channel, and sending at least one character of a command to said DTE.

14. The method of claim 13 wherein said predetermined set comprises the ASCII characters DC2, XON and XOFF.

15. The method of claim 14 wherein said first character is the ASCII character R when said character of said data is the ASCII character DC2.

16. The method of claim 14 wherein said first character is the ASCII character S when said character of said data is the ASCII character DC3 (XOFF).

17. The method of claim 14 wherein said first character is the ASCII character Q when said character of said data is the ASCII character DC1 (XON).

18. The method of claim 13 wherein said command procedure further comprises sending a code CL to said DTE, wherein C is a predetermined value indicating a break signal, and L indicates the duration of said break signal.

19. In a data transfer system containing a data terminal equipment (DTE) and a data communications equipment (DCE), a method for receiving commands or data sent to said DTE from said DCE, comprising the steps of:
(A) inspecting each character of said data received from said DCE;
(B) if said character is the ASCII character DC2, then inspecting a next character of said data;
   (i) if said next character is one of a predetermined set of characters, then generating a first character corresponding to said next character, and treating said first character as data from said DCE;
   (ii) if said next character is the code AN, where A is a predetermined value and N is a channel number, then enabling data channel N;
   (iii) if said next character is the code BN, where B is a predetermined value, and said data channel N has been enabled by said DTE, then identifying said data channel N as a selected data channel;

(iv) otherwise, treating said next character as a command character; and (C) if said character is not the ASCII character DC2, then treating said character as data from said DCE on a data channel which has been enabled by said DTE and which was last selected by said DCE.

20. The method of claim 19 wherein said predetermined set comprises the ASCII characters Q, R, and S.

21. The method of claim 20 wherein said first character is the ASCII character DC2 when said character of said data is the ASCII character R.

22. The method of claim 20 wherein said first character is the ASCII character DC3 (XOFF) when said character of said data is the ASCII character S.

23. The method of claim 20 wherein said first character is the ASCII character DC1 (XON) when said character of said data is the ASCII character Q.

24. The method of claim 19 and further comprising the following step between step (A) and step (B) (iv):

if said next character is the code CL, wherein C is a predetermined value, then responding as if a break signal of duration L had been received.

* * * * *